(12) United States Patent
Ambai et al.

(10) Patent No.: US 8,630,482 B2
(45) Date of Patent: Jan. 14, 2014

(54) FEATURE CONVERSION DEVICE, SIMILAR INFORMATION SEARCH APPARATUS PROVIDED THEREWITH, CODING PARAMETER GENERATION METHOD, AND COMPUTER PROGRAM

(75) Inventors: Mitsuru Ambai, Shibuya-ku (JP); Yuichi Yoshida, Tokyo (JP)

(73) Assignee: Denso IT Laboratory, Inc., Tokyo (JP)

( * ) Notice: Subject to any disclaimer, the term of this patent is extended or adjusted under 35 U.S.C. 154(b) by 137 days.

(21) Appl. No.: 13/405,716

(22) Filed: Feb. 27, 2012

(65) Prior Publication Data

US 2012/0219212 A1 Aug. 30, 2012

(30) Foreign Application Priority Data

Feb. 28, 2011 (JP) ................. 2011-042031

(51) Int. Cl.
*G06K 9/62* (2006.01)
(52) U.S. Cl.
USPC ........... 382/159; 382/156; 382/224; 382/227; 382/187; 382/228
(58) Field of Classification Search
CPC ......... G06K 9/68; G06K 9/481; G06K 9/522; G06K 9/6244; G06K 9/6269; G06T 2207/20081; G06T 2207/10016
USPC .................. 382/159, 156, 224, 227, 187, 228
See application file for complete search history.

(56) References Cited

U.S. PATENT DOCUMENTS

| 6,205,247 B1 * | 3/2001 | Breuer et al. ................. 382/228 |
| 2003/0018604 A1 | 1/2003 | Franz et al. |
| 2005/0246354 A1 | 11/2005 | Tamayo et al. |

FOREIGN PATENT DOCUMENTS

WO WO 2011/018823 A1 2/2011

OTHER PUBLICATIONS

J. L. Bentley, "Multidimensional Binary Search Trees Used for Associative Searching," Communications of the ACM, 18(9): 509-517, 1975.
Michael X. Goemans, et al., "Improved Approximation Algorithms for Maximum Cut and Satisfiability Problems Using Semidefinite Programming," Journal of the ACM vol. 42, Issue 6 (Nov. 1995) pp. 1115-1145.
Ping Li, et al., "Very Sparse Random Projections," KDD '06 Proceedings of the 12th ACM SIGKDD International Conference on Knowledge Discovery and Data Mining, Aug. 20-23, 2006.
Piotr Indyk, et al., "Approximate Nearest Neighbors: Towards Removing the Curse of Dimensionality," Proceedings of 30th Symposium on Theory of Computing, 1998.

(Continued)

*Primary Examiner* — Mike Rahmjoo
(74) *Attorney, Agent, or Firm* — Birch, Stewart, Kolasch & Birch, LLP

(57) ABSTRACT

A bit code converter transforms a learning feature vector using a transformation matrix updated by a transformation matrix update unit, and converts the transformed learning feature vector into a bit code. When the transformation matrix update unit substitutes a substitution candidate for an element of the transformation matrix, a cost function calculator fixes the substitution candidate that minimizes a cost function as the element. The transformation matrix update unit selects the element while sequentially changing the elements, and the cost function calculator fixes the selected element every time the transformation matrix update unit selects the element, thereby finally fixing the optimum transformation matrix. A substitution candidate specifying unit specifies the substitution candidate such that a speed of transformation processing that the bit code converter performs using the transformation matrix using the transformation matrix is enhanced based on a constraint condition stored in a constraint condition storage unit.

17 Claims, 12 Drawing Sheets

(56) References Cited

OTHER PUBLICATIONS

Yair Weiss, et al., "Spectral Hashing," Advances in Neural Information Processing Systems, 2008.

Japanese Office Action for corresponding Japanese application No. 2011-042031, dated Jan. 15, 2013.

Minoru Sasaki, et al., "Dimensional-Space Reduction of Vector Space Model Based on Random Projection," pp. 25-32, Joho Shori Gakkai kenkyu Hokoku Journal, Japan, Jan. 27, 2000.

European Search Report for corresponding application No. 12157185.5, dated Aug. 12, 2012.

Hakan Cevikalp et al., "Semi-Supervised Dimensionality Reduction Using Pairwise Equivalence Constraints," Proceedings of the Third International Conference on Computer Vision Theory and Applications, vol. 2, Jan. 1, 2008, pp. 489-496.

Mitsuru Ambai et al., "Dimensionality Reduction for Histogram Features Based on Supervised Non-negative Matrix Factorization," IEICE Transactions on Information and Systems, vol. E94-D, No. 10, Oct. 1, 2011, pp. 1870-1879.

* cited by examiner

Fig.5

| PRE-CONVERSION | POST-CONVERSION | |
|---|---|---|
| $W_{u,v}$ | CANDIDATE 1 | CANDIDATE 2 |
| 1 | -1 | 0 |
| 0 | 1 | -1 |
| -1 | 0 | 1 |

Fig.6

| PRE-CONVERSION | POST-CONVERSION |
|---|---|
| $W_{u,v}$ | CANDIDATE |
| 1 | -1 |
| 0 | × |
| -1 | 1 |

Fig.7

| PRE-CONVERSION | POST-CONVERSION | | |
|---|---|---|---|
| $(W_{u,v}, W_{p,q})$ | CANDIDATE 1 | CANDIDATE 2 | CANDIDATE 3 |
| ( 1, 1 ) | (-1,-1) | ( 1,-1) | (-1, 1) |
| (-1, 1 ) | ( 1, 1) | (-1,-1) | ( 1,-1) |
| ( 1,-1 ) | (-1, 1) | ( 1, 1) | (-1,-1) |
| (-1,-1 ) | ( 1,-1) | (-1, 1) | ( 1, 1) |
| ( 0, 1 ) | (-1, 0) | ( 1, 0) | ( 0,-1) |
| ( 0,-1 ) | ( 0, 1) | (-1, 0) | ( 1, 0) |
| ( 1, 0 ) | ( 0,-1) | ( 0, 1) | (-1, 0) |
| (-1, 0 ) | ( 1, 0) | ( 0,-1) | ( 0, 1) |
| ( 0, 0 ) | × | × | × |

Fig.10

$YA = sgn(W^T * XA)$ — $YB = sgn(W^T * XB)$ = $Dh$, $0 \leq Dh \leq 1$

FEATURE CONVERSION DEVICE, SIMILAR INFORMATION SEARCH APPARATUS PROVIDED THEREWITH, CODING PARAMETER GENERATION METHOD, AND COMPUTER PROGRAM

BACKGROUND OF THE INVENTION

1. Field of the Invention

The present invention relates to a feature conversion device that converts a feature vector into a bit code using a transformation matrix in order to search similar information, and a similar information search apparatus provided therewith.

2. Description of Related Art

In a similar information search technology such as an image search, voice recognition, a text search, and pattern recognition, a feature vector is used in processing for evaluating a degree of similarity between a certain piece of information and another piece of information. The feature vector is one into which the information such as an image, a voice, and a text is converted so as to be easily dealt with by a computer. The feature vector is expressed by a D-dimensional vector. For example, an image A and an image B are regarded to be similar in the case of a small distance between the feature vector of the image A and the feature vector of the image B. Similarly, a voice waveform C and a voice waveform D are regarded to be similar in the case of the small distance between the feature vector of the voice waveform C and the feature vector of the voice waveform D. Thus, in the similar information search technology such as the image search, the voice recognition, the text search, and the pattern recognition, the degree of similarity between the pieces of information is evaluated by comparing the feature vectors.

For example, an L1 norm, an L2 norm, and an intervector angle are used as a scale for the distance between the following feature vectors.

$x, y \in R^D$

These scales can be calculated with respect to the following feature vector using expressions (1) to (3).

L1 norm (1)

$$\|x - y\|_1 = \sum_i |x_i - y_i|$$

L2 norm (2)

$$\|x - y\|_2 = \sqrt{\sum_i (x_i - y_i)^2}$$

Intervector Angle $$\theta = \cos^{-1}\left(\frac{xy}{\|x\|_2 \|y\|_2}\right) \quad (3)$$

In the similar information search technology, information similar to particular information (input information) is searched from a large amount of information (sometimes becomes hundred millions depending on intended use). Therefore, there is developed a technology called a nearest neighbor search technology for searching k most similar feature vectors at high speed from feature vectors of the large amount of information with respect to the feature vector of the input information. A k-nearest neighbor search and an approximate k-nearest neighbor search are well known as the nearest neighbor search technology.

The k-nearest neighbor search is a technology for searching the k feature vectors having the closest distance at high speed from a large amount of feature vectors. For example, k-dtree can be cited as a typical technique of the k-nearest neighbor search (for example, see J. L. Bentley, Multidimensional binary search trees used for associative searching, Communications of the ACM, 18 (9): 509-517, 1975). The approximate k-nearest neighbor search is also a technology for searching the k feature vectors having the closest distance at high speed from the large amount of feature vectors. However, in the approximate k-nearest neighbor search, processing can be implemented at a speed much higher than that of the k-nearest neighbor search (hundreds of times to thousands of times) by permitting an error. For example, LSH can be cited as a typical technique of the approximate k-nearest neighbor search (for example, see Indyk, Piotr, Motwani, and Rajeev, "Approximate Nearest Neighbors: Towards Removing the Curse of Dimensionality", Proceedings of 30th Symposium on Theory of Computing (1998)).

Recently, with increasing amount of information dealt with by a computer, frequently the large amount of high-dimensional feature vectors are dealt with in the similar information search technology. Therefore, the following two points become serious problems.

The first problem is that a calculation of a distance between two feature vectors is too slow.

$x, y \in R^D$

For example, in the case that a square of an L2 norm is used as a scale of the distance, because of $$\|x - y\|_2^2 = \sum_{i=1}^{D} (x_i - y_i)^2$$

it is necessary to perform a D-time subtraction, a D-time multiplication, and a (D−1)-time addition. In many cases, because the feature vector is expressed by a single-precision real number (float), a calculation load becomes extremely high. When the feature vector becomes high-dimensional, the calculation load is further increased. When the number of feature vectors dealt with is largely increased, it is necessary to perform the large amount of distance calculation, which further increases the calculation load. Therefore, even if the k-nearest neighbor search algorithm is applied, frequently the sufficient speed is hardly obtained.

The second problem is that a large amount of memory is consumed. In the case that the feature vector is expressed by a 4-byte single-precision real number, the D-dimensional feature vector consumes a 4D-byte memory. An amount of consumption of the memory is increased with increasing dimension of the feature vector. The amount of consumed memory is increased with increasing number of feature vectors. In the case that the feature vector overflows from a main memory, it is necessary to store the feature vector in a secondary domain such as a hard disk. However, in the case that the secondary domain is used, a processing speed is dramatically decreased.

Therefore, recently a technique of solving the two problems has been proposed by performing binary bit coding of the feature vector. Examples of the typical techniques include random projection (for example, see Michel X. Goemans, avid P. Williamson, "Improved approximation algorithms for maximum cut and satisfiability problems using semidefinite programming", Journal of the ACM Volume 42, Issue 6 (November 1995) Pages 1115-1145), very sparse random projection (for example, see Ping Li, Trevor J. Hastie, Kenneth W. Church, "Very sparse random projections", KDD '06 Proceedings of the 12th ACM SIGKDD international conference on Knowledge discovery and data mining (2006)), and spectral hashing (for example, see Y. Weiss, A. Torralba, R. Fergus, "Spectral Hashing", Advances in Neural Information Processing Systems, 2008).

In these techniques, the D-dimensional feature vector is converted into a d-bit binary bit code. The conversion is performed such that a distance in an original space is strongly correlated with a Hamming distance in a space of a post-conversion (for example, see Michel X. Goemans, avid P. Williamson, "Improved approximation algorithms for maximum cut and satisfiability problems using semidefinite programming", Journal of the ACM Volume 42, Issue 6 (November 1995) Pages 1115-1145, particularly Lemma 3.2 of page 1121 describes a reason to strongly correlate the distance in the original space with the Hamming distance in the space of the post-conversion). The Hamming distance means the number of different bits counted in two corresponding bit codes. The calculation can be performed at extremely high speed, because only the number of bits of 1 is counted after XOR of the two bit codes is calculated. In many cases, speed enhancement can be achieved tens of times to hundreds of times. Additionally the memory in which 4D bytes are originally required can be decreased to d/8 bytes. Therefore, the memory can be saved to a few hundredths to a few thousandths.

Many bit coding algorithm can be described in a general form by an expression (4).

$$y = sgn(f(W^T x + b)) \quad (4)$$

Where x is a (D-dimensional) feature vector, W is a (D-by-d) transformation matrix, b is a (d-dimensional) bias, y is a (d-dimensional) bit code, f(z) is a nonlinear function, and sgn(z) is a sign function (the function returns −1 when a value is negative, and the function returns is 1 when the value is positive). From the expression (4), an element of y becomes either +1 or −1. It is assumed that "1" and "0" are lined up to form the bit code when +1 is set to "1" while −1 is set to "0".

In the case of the random projection, an element that is sampled from a normal distribution having an average of zero and a dispersion of 1 is used as the element of W. It is assumed that the bias b is an average value or a median of a zero vector and the previously-collected feature vectors. The nonlinear function is defined as f(z)=z.

In the case of the very sparse random projection, the element of W is selected with a probability of {−1,0,1} to {½*sqrt(D),1−1/sqrt(D),½*sqrt(D)}. D is a dimension number of the feature vector. It is assumed that the bias b is the average value or the median of the zero vector and the previously-collected feature vectors. The nonlinear function is defined as f(z)=z. Because W becomes extremely sparse (for example, about 90% of the feature vectors become 0 in the case of the 128-dimensional feature vector), the high-speed calculation can be performed.

In the case of the spectral hashing, a principal component analysis is applied to the previously-collected feature vectors (training set), and a fixed principal component axis is set to a column vector. It is assumed that b is an average of the training set. A trigonometric function is used as the nonlinear function f(z). In the case of the spectral hashing, the shorter bit code can be generated because the binary bit coding is performed based on the learning.

However, the binary bit coding techniques of the related art have the following problems. A first problem is that the bit coding is slow in the techniques of the related art. That is, in the case that the D-dimensional vector is converted into the d-bit code, it is necessary to perform the (D×d)-time multiplication and the (D×(d−1))-time addition in order to calculate $W^T x$ of the expression (4). Accordingly, in the techniques of the related art, although the speed of the distance calculation can be enhanced, the bit coding that is of the preceding processing of the distance calculation becomes a bottleneck. The first problem becomes serious with increasing dimension number D of the feature vector. Particularly, the techniques of the related art are very inconvenient in the case that the bit coding is required in real time, for example, in the case that the techniques of the related art are applied to a real-time image search or real-time voice recognition.

A second problem is that the bit code could be long. That is, in the case that W is constructed based on a random number, because a distribution of the feature vector is not considered, the long bit code is required in order to obtain sufficient performance.

In the binary bit coding techniques of the related art, the random projection has the first and second problems, the very sparse random projection has the second problem, and the spectral hashing has the first problem.

SUMMARY OF THE INVENTION

In view of the foregoing, an object of the invention is to provide a feature conversion device, in which bit coding of a feature vector can be performed at high speed and a short bit code can be generated.

In order to solve the problems of the related art, a feature conversion device according to an aspect of the invention includes: a learning pair selector that inputs plural learning feature vectors thereto and selects plural pairs of learning feature vectors from the learning feature vectors; a bit code converter that transforms the learning feature vector using a transformation matrix and converts the transformed learning feature vector into a bit code; a cost function calculator that calculates a cost function indicating a sum of differences between a distance between the learning feature vectors input to the learning pair selector and a distance between the bit codes into which the transformed learning feature vectors are converted by the bit code converter with respect to all the pairs of learning feature vectors; and a transformation matrix update unit that selects an element of the transformation matrix used in the bit code converter and substitutes a substitution candidate for the selected element to update the transformation matrix. The bit code converter transforms the learning feature vector using the transformation matrix updated by the transformation matrix update unit and converts the transformed learning feature vector into a bit code, and the cost function calculator fixes the element by selecting one element from the substitution candidate and the original element based on a predetermined method when the transformation matrix update unit substitutes the substitution candidate for the element of the transformation matrix. The transformation matrix update unit selects the element while sequentially changing the elements, and the cost function calculator fixes the selected element every time the transformation matrix update unit selects the element, thereby finally fixing the optimum transformation matrix. The substitution candidate is specified such that a speed of transformation processing that the bit code converter performs using the transformation matrix is enhanced.

According to the above configuration, because the transformation matrix is optimized based on the learning, the generated bit code is shortened. The element of the finally-fixed optimum transformation matrix is fixed such that the speed of the bit code conversion processing performed by the bit code converter is enhanced, so that the bit code can be converted at high speed using the optimum transformation matrix. The optimum transformation matrix is fixed by the technique, in which transformation matrix update unit selects the element while sequentially changing the elements and the cost function calculator fixes the selected element every time the transformation matrix update unit selects the element. Therefore, the cost function can effectively be decreased even if the cost function is nonlinear and indifferentiable. Therefore, the distance between the learning feature vectors input to the learning pair selector can be approximated with sufficient accuracy by the distance between the bit codes into which the learning feature vectors are converted by the bit code converter. Accordingly, even the short bit code can sufficiently exert performance in the nearest neighbor search.

In the feature conversion device, the cost function calculator may calculate an amount of change of the cost function when each of the substitution candidates is substituted for the element, fix an adoption probability according to the amount of change, and select one element from the substitution candidate and the original element according to the adoption probability.

According to the above configuration, the element is fixed based on the amount of change of the cost function, so that the element can suitably be fixed. For example, the cost function calculator may fix the element using the substitution candidate that minimizes the cost function. As used herein the amount of change of the cost function means a difference value between the cost function before a certain substitution candidate is substituted for the selected element and the cost function after the substitution candidate is substituted for the selected element.

In the feature conversion device, the distance between the learning feature vectors input to the learning pair selector with respect to the pair of learning feature vectors may be a distance based on one of an L1 norm, an L2 norm, and an intervector angle.

In the feature conversion device, the distance between the bit codes converted by the bit code converter with respect to the pair of learning feature vectors may be a distance based on the Hamming distance.

In the feature conversion device, the element of the transformation matrix may be restricted to an integer, and the substitution candidate may be restricted to an integer.

According to the above configuration, the speed of the bit code conversion processing performed by the bit code converter can further be enhanced.

In the feature conversion device, the element of the transformation matrix may be restricted to one of −1, 0, and 1, and the substitution candidate may be restricted to one of −1, 0, and 1.

According to the above configuration, necessity of a multiplication is eliminated when the bit code converter performs the conversion using the transformation matrix, so that the speed of the bit code conversion processing can further be enhanced.

In the feature conversion device, the number of non-zero elements of the transformation matrix may be restricted to a predetermined range, and the substitution candidate may be specified such that the number of non-zero elements of the transformation matrix is maintained within the predetermined range.

According to the above configuration, the transformation matrix is made sparse, so that the speed of the bit code conversion processing can further be enhanced when the bit code converter performs the conversion using the transformation matrix. The predetermined range may be a range having a width of 1. That is, the number of non-zero elements may be fixed by a specific number.

In the feature conversion device, the element of the transformation matrix may be restricted to a power-of-two number, and the substitution candidate may be restricted to a power-of-two number.

According to the above configuration, a bit shift technique can be used when the bit code converter performs the conversion using the transformation matrix, and the speed of the bit code conversion processing can further be enhanced.

In the feature conversion device, the learning pair selector may select an arbitrary pair of learning feature vectors from the plural input learning feature vectors.

According to the above configuration, the transformation matrix, which can perform the approximation with high accuracy and is used to convert the learning feature vector into the bit code, can suitably be fixed.

In the feature conversion device, the learning pair selector may select a pair of learning feature vectors from the plural input learning feature vectors based on the distance between the learning feature vectors.

According to the above configuration, the distance between the learning feature vectors input to the learning pair selector can be approximated with sufficient accuracy by the distance between the bit codes into which the learning feature vectors are converted by the bit code converter. Accordingly, even the shorter bit code can sufficiently exert performance in the nearest neighbor search.

In the feature conversion device, the learning pair selector may select a pair of learning feature vectors from the plural input learning feature vectors such that the number of sets of a pair of learning feature vectors having the distance lower than a predetermined distance and the number of sets of a pair of learning feature vectors having the distance not lower than the predetermined distance become a predetermined ratio.

In the feature conversion device, the learning pair selector may select a pair of learning feature vectors from the plural input learning feature vectors such that a frequency of the distance becomes a uniform distribution or a particular distribution.

In the feature conversion device, the learning pair selector may select a pair of learning feature vectors from the plural input learning feature vectors such that the number of sets of a pair of learning feature vectors having the farthest distance relationship and the number of sets of a pair of learning feature vectors having the closest distance relationship become a predetermined ratio.

In the feature conversion device, the cost function calculator may use a result of the cost function, which is calculated using the transformation matrix before the transformation matrix update unit substitutes the substitution candidate for the element of the transformation matrix, to calculate the cost function of the transformation matrix after the transformation matrix update unit substitutes the substitution candidate for the element of the transformation matrix.

According to the above configuration, the speed of the calculation to fix the optimum transformation matrix can further be enhanced.

A similar information search apparatus according to another aspect of the invention includes: one of the feature conversion devices described above; and a similar vector search unit, wherein the bit code converter converts the plural learning feature vectors into the plural bit codes using the fixed optimum transformation matrix, the bit code converter converts an input feature vector into the bit code using the fixed optimum transformation matrix when the input feature vector is provided, and the similar vector search unit includes: a bit code retaining unit that retains the plural bit codes into which the plural learning feature vectors are converted by the bit code converter; and a nearest neighbor search unit that inputs the bit code into which the feature vector is converted by the input bit code converter and searches a bit code similar to the bit code into which the feature vector is converted, the bit code is searched from the plural bit codes retained by the bit code retaining unit by a nearest neighbor search.

According to still another aspect of the invention, a coding parameter generating method for outputting a transformation matrix as a coding parameter used to convert a feature vector into a bit code, the coding parameter generating method includes: a first step of selecting plural pairs of learning feature vectors from plural learning feature vectors; a second step of initializing the transformation matrix under a constraint condition; a third step of calculating a cost function indicating a sum of differences between a distance between the learning feature vectors and a distance between the bit codes into which the learning feature vectors are converted using the initialized transformation matrix with respect to the plural pairs of learning feature vectors; a fourth step of selecting an element set to a substitution target from elements of the transformation matrix; a fifth step of substituting a particular substitution candidate for the element selected in the fourth step; a sixth step of calculating the cost function using the transformation matrix in which the substitution candidate is substituted for the selected element in the fifth step; a seventh step of determining whether all the substitution candidates are substituted for the selected element, and returning to the fifth step when all the substitution candidates are not substituted for the selected element; an eighth step of tentatively fixing an optimum transformation matrix by fixing the substitution candidate having the smallest calculated cost function in the substitution candidates as the selected element when all the substitution candidates are substituted for the selected element in the seventh step; a ninth step of determining whether the optimum transformation matrix tentatively fixed in the eighth step converges, and returning to the fourth step when the optimum transformation matrix does not converge; and a tenth step of outputting the tentatively-fixed optimum transformation matrix as a finally-fixed optimum transformation matrix when the optimum transformation matrix tentatively fixed in the eighth step converges.

A computer program according to still another aspect of the invention is a computer program that causes a computer to perform the coding parameter generation method.

According to the invention, the transformation matrix, which can perform the bit code conversion at high speed and generate the short bit code, can be generated.

BRIEF DESCRIPTION OF THE DRAWINGS

FIG. 5 is a view illustrating a substitution candidate specified by a substitution candidate specifying unit in a specific example 1 of the optimum transformation matrix determining method in the embodiment;

FIG. 6 is a view illustrating a substitution candidate specified by the substitution candidate specifying unit in a specific example 2 of the optimum transformation matrix determining method in the embodiment;

FIG. 7 is a view illustrating a substitution candidate specified by the substitution candidate specifying unit in a specific example 3 of the optimum transformation matrix determining method in the embodiment;

FIG. 10 is a view illustrating processing of fixing a Hamming distance after the feature vector XA and the feature vector XB are converted into a bit code YA and a bit code YB in the embodiment;

DETAILED DESCRIPTION

An embodiment of the invention will be described below. Hereinafter, "bit coding" and "bit code conversion" are used in the same meaning.

Figure 2:
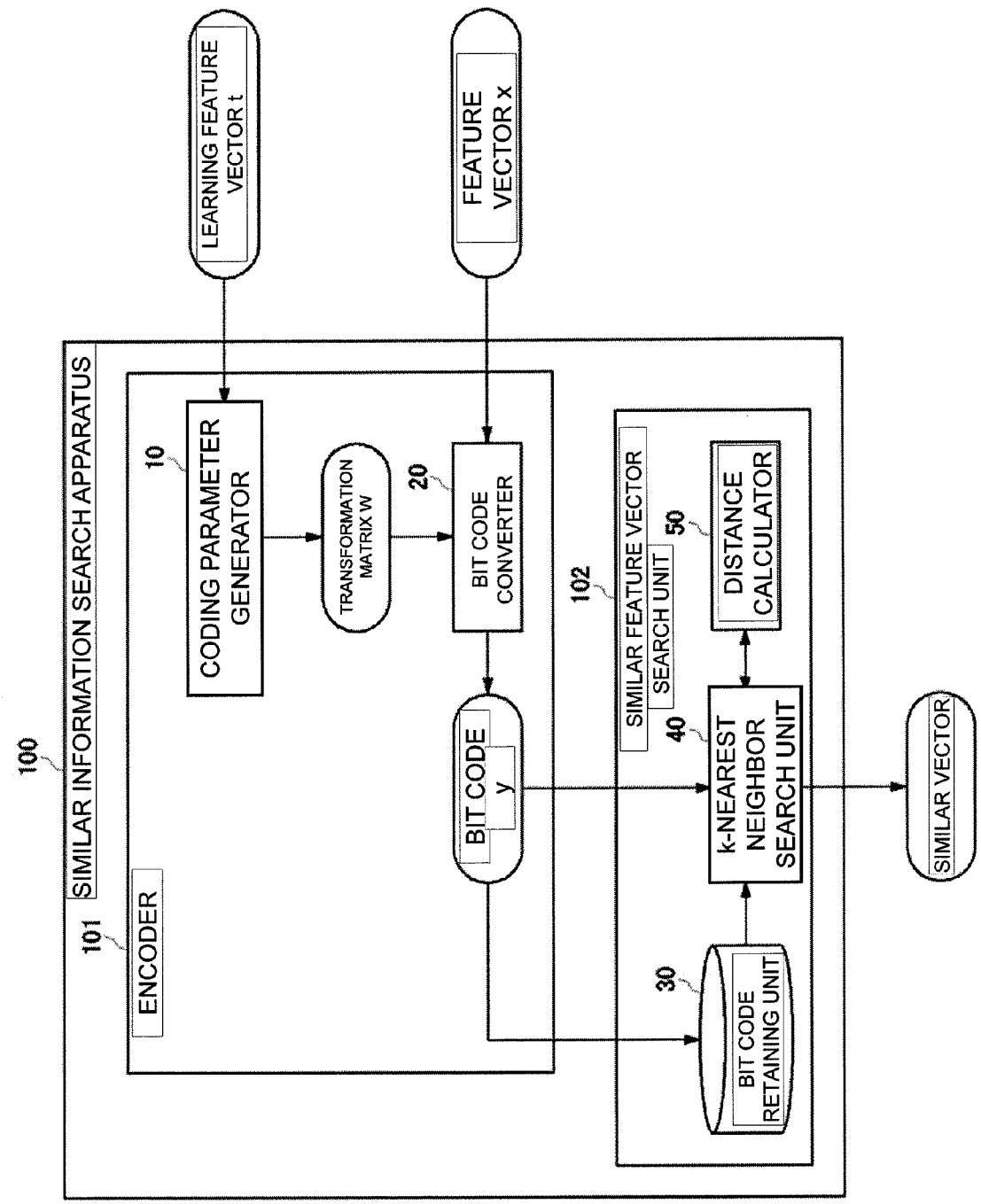
FIG. 2 is a block diagram illustrating a configuration of a similar information search apparatus of the embodiment.

FIG. 2 is a block diagram illustrating a configuration of a similar information search apparatus according to an embodiment of the invention. Referring to FIG. 2, a similar information search apparatus 100 includes an encoder 101 and a similar feature vector search unit 102. The encoder 101 converts a single-precision-real-number feature vector into a bit code. The encoder 101 corresponds to the feature conversion device of the invention. The similar feature vector search unit 102 searches k similar vectors with respect to the input feature vector by the k-nearest neighbor.

Figure 1:
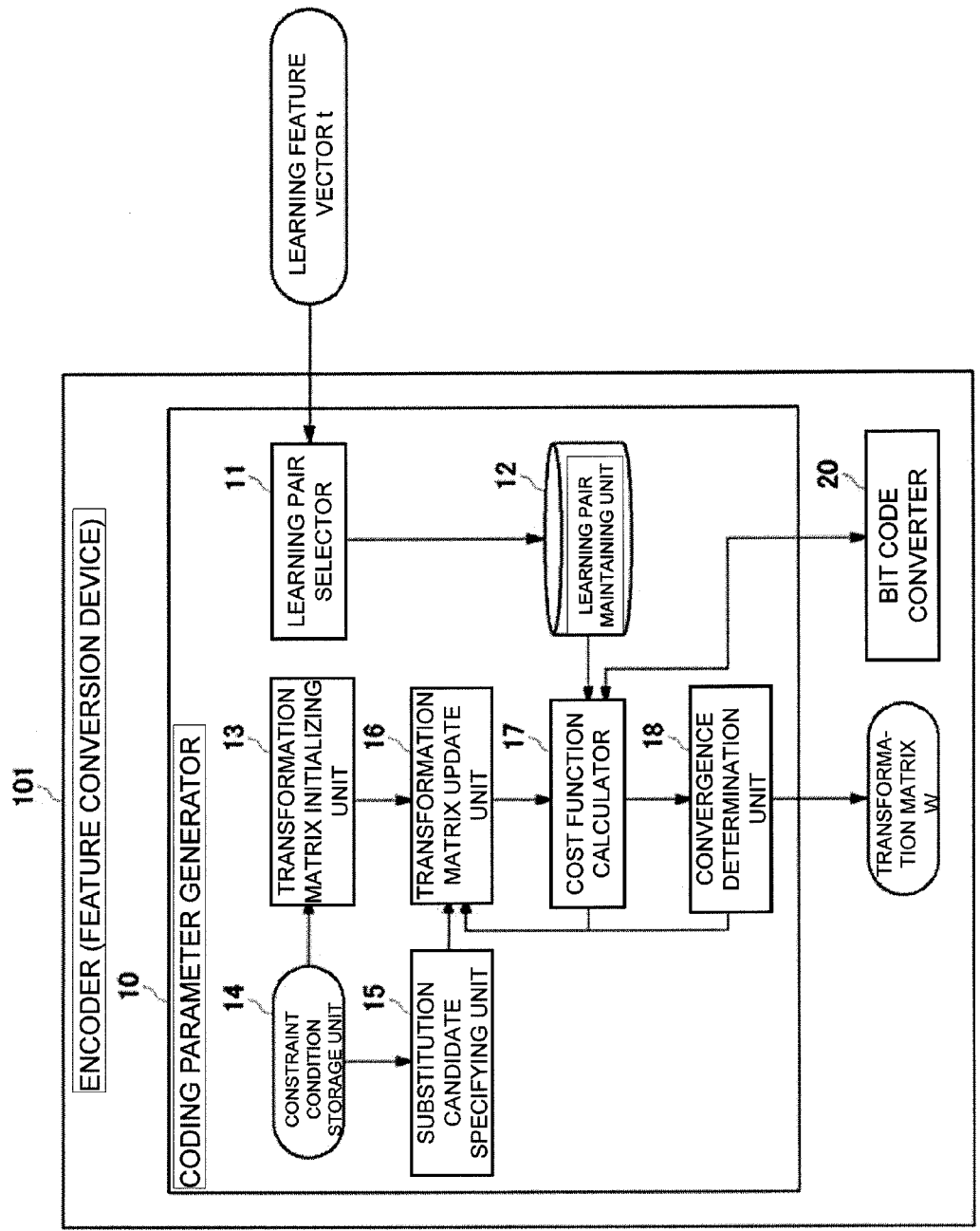
FIG. 1 is a block diagram illustrating a configuration of an encoder according to an embodiment of the invention.

FIG. 1 is a block diagram illustrating a configuration of the encoder 101. The encoder 101 includes a coding parameter generator 10 and a bit code converter 20. The coding parameter generator 10 generates a parameter necessary to convert the single-precision-real-number feature vector into the bit code using learning feature vectors t, and the coding parameter generator 10 outputs the parameter to the bit code converter 20. Specifically, the coding parameter generator 10 fixes a transformation matrix W used in a bit code conversion as a coding parameter. The bit code converter 20 performs bit coding of the feature vector using the parameter generated by the coding parameter generator 10.

The similar feature vector search unit 102 includes a bit code retaining unit 30, a k-nearest neighbor search unit 40, and a distance calculator 50. Plural bit coded feature vectors (hereinafter the bit coded feature vector is simply referred to as a "bit code") are retained in the bit code retaining unit 30. In searching information similar to input information, the similar feature vector search unit 102 searches the bit code similar to the bit code into which the feature vector of the input information is converted from the plural bit codes retained in the bit code retaining unit 30. The bit codes into which the feature vectors are converted by the bit code converter 20 of the encoder 101 are retained in the bit code retaining unit 30. The feature vector of the input information is also converted into the bit code by the bit code converter 20.

The bit code of the input information is input to the k-nearest neighbor search unit 40. The k-nearest neighbor search unit 40 searches the bit code similar to the bit code of the input information from the plural bit codes retained in the bit code retaining unit 30, and the k-nearest neighbor search unit 40 outputs the searched bit code as the similar vector. When the k-nearest neighbor search unit 40 searches the similar bit code, the distance calculator 50 calculates a distance between the bit codes, and provides the distance to the k-nearest neighbor search unit 40.

One of the features of the invention is the encoder 101, particularly the coding parameter generator 10 that generates the coding parameter (transformation matrix W) used to convert the feature vector into the bit code in the bit code converter 20. The following definitions are made before the description of the coding parameter generator 10.

The feature vector of pre-transformation is defined by an expression (5).

$$x \in \Re^D \quad (5)$$

In the expression (5), D is a dimension number of the feature vector.

The bit code of post-transformation is defined by an expression (6).

$$y \in B^d \quad (6)$$

In the expression (6), d is a bit length of the bit code. This means that y is a d-dimensional vector and that each element of d takes only a value of 0 or 1. That is, y can be interpreted as the bit code.

The transformation matrix is defined by an expression (7).

$$W \in \Re^{D \times d} \quad (7)$$

The bit coding is defined by an expression (8).

$$y = sgn(W^T x) \quad (8)$$

A degree of similarity (normalized cosine distance) in a feature space of the pre-transformation is defined by an expression (9).

$$D_{cos}(x_u, x_v) = \frac{1 - \frac{x_u x_v}{|x_u||x_v|}}{2} \quad (9)$$

Alternatively, other scales such as the L1 norm and the L2 norm may be used as the scale of the degree of similarity in the feature space of the pre-transformation. For example, a value in which an angle θ of the expression (3) is normalized by a circumference ratio π may be used as the scale.

A degree of similarity (normalized Hamming distance) in the feature space of the post-transformation is defined by an expression (10).

$$D_{hamming}(y_u, y_v) = \frac{h(y_u, y_v)}{b} \quad (10)$$

In the expression (10), h( ) is a function for fixing the Hamming distance.

As can be seen from the expressions (9) and (10), the normalized cosine distance and the normalized Hamming distance are normalized so as to take a value ranging from 0 to 1. The degree of similarity of the feature is increased with decreasing distance, and the degree of similarity of the feature is decreased with increasing distance.

A configuration of the encoder 101, particularly the coding parameter generator 10 will be described below. The coding parameter generator 10 includes a learning pair selector 11, a learning pair maintaining unit 12, a transformation matrix initializing unit 13, a constraint condition storage unit 14, a substitution candidate specifying unit 15, a transformation matrix update unit 16, a cost function calculator 17, and a convergence determination unit 18.

Plural learning feature vectors (hereinafter simply referred to as a "learning vector") are input to the learning pair selector 11. The learning vector is defined by an expression (11).

$$x_1, x_2, \ldots, x_N \in \Re^D \quad (11)$$

In the expression (11), for example, the number of learning vectors N can be set to 10000.

Figure 3:
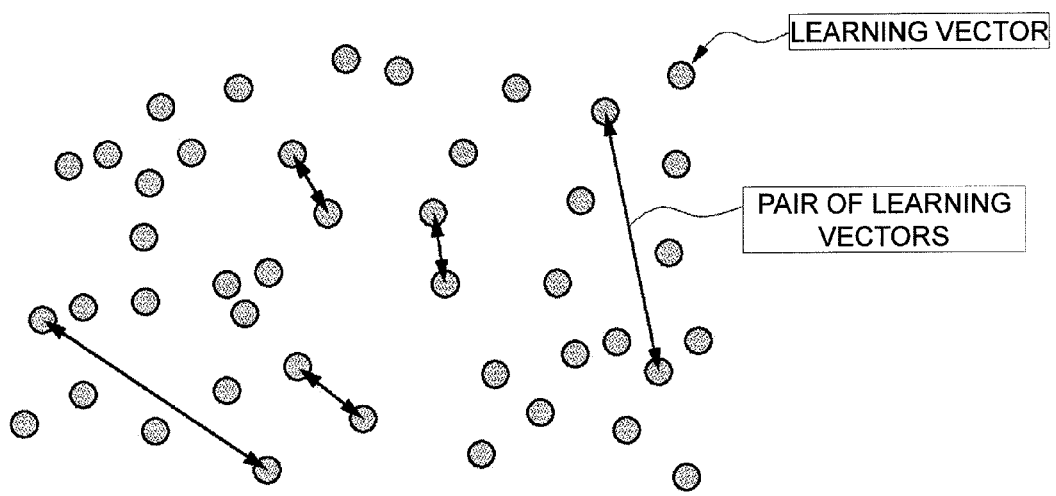
FIG. 3 is a view conceptually illustrating a learning vector and a pair of learning vectors in the embodiment.

The learning pair selector 11 selects the pair of learning vectors from the input learning vectors. FIG. 3 is a view conceptually illustrating the learning vector and the pair of learning vectors. The learning pair selector 11 preferably selects the number of pairs as many as possible. For example, the learning pair selector 11 selects the pair as follows. The learning pair selector 11 can select all combinations of the input learning vectors as the pair. The learning pair selector 11 can randomly select the predetermined number of pairs from the input learning vectors.

The learning pair selector 11 can select the pair depending on the distance. For example, the learning pair selector 11 can equally select the number of pairs of learning vectors having the longest distance and the number of pairs of learning vectors having the closest distance. The learning pair selector 11 may select the pair such that a frequency of the distance becomes even. The learning pair selector 11 may equally select the number of pairs of learning vectors having a distance lower than a constant distance d_th and the number of pairs of learning vectors having a distance not lower than the constant distance d_th.

The learning pair maintaining unit 12 maintains the pairs of learning vectors selected by the learning pair selector 11. Each pair of learning vectors maintained in the learning pair maintaining unit 12 is output to the cost function calculator 17, and the cost function calculator 17 calculates the cost function using each pair of learning vectors.

The cost function calculated by the cost function calculator 17 is defined by an expression (12).

$$f(W) = \sum_{(u,v) \in P} (D_{cos}(x_u, x_v) - D_{hamming}(y_u, y_v))^2 \quad (12)$$

Where P is a set of the pairs of learning vectors input from the learning pair maintaining unit 12.

The cost function calculator 17 fixes W such that f(W) is minimized. That is, the cost function calculator 17 fixes W such that the cosine distance in the space of the pre-transformation and the Hamming distance in the space of the post-transformation are matched with each other as much as possible. The bit code conversion necessary at that time is performed by the bit code converter 20.

Generally a technique of fixing an inflection point x by differentiating a function y(x) when x minimizing the function y(x) is fixed. However, because the cost function f(W) of the embodiment cannot be differentiated as illustrated in the expression (12), a general optimizing technique cannot be adopted. Therefore, the coding parameter generator 10 of the embodiment minimizes f(W) by a later-described method, and outputs the transformation matrix W at that time as an optimum transformation matrix to the bit code converter 20.

A configuration for fixing the optimum transformation matrix will be described. Under a constraint condition stored in the constraint condition storage unit 14, the transformation matrix initializing unit 13 initializes the transformation matrix W and outputs the initialized transformation matrix W to the transformation matrix update unit 16. The constraint condition is stored in the constraint condition storage unit 14. The constraint condition is imposed on an element of the transformation matrix, when the transformation matrix initializing unit 13 initializes the transformation matrix, and when the substitution candidate specifying unit 15 specifies a substitution candidate in order to substitute the substitution candidate for the element of the transformation matrix.

The substitution candidate specifying unit 15 specifies the substitution candidate for the element selected in the transformation matrix, and outputs the substitution candidate to the transformation matrix update unit 16. The transformation matrix update unit 16 outputs the initialized transformation matrix, which is input from the transformation matrix initializing unit 14, to the cost function calculator 17. The transformation matrix update unit 16 also selects the element, which is of a substitution target, from the elements of the initialized transformation matrix W, substitutes the substitution candidate specified by the substitution candidate specifying unit 15 for the selected element, and outputs the transformation matrix W to the cost function calculator 17. When receiving a report of non-convergence from the convergence determination unit 18, the transformation matrix update unit 16 selects a new substitution target element with respect to the tentatively-fixed transformation matrix W, and substitutes the substitution candidate specified by the substitution candidate specifying unit 15 for the new substitution target element.

The cost function calculator 17 calculates a cost by the expression (12) using the transformation matrix input from the transformation matrix update unit 16. The cost function calculator 17 compares the costs calculated by the plural transformation matrices in each of which each of plural substitution candidates is substituted for the selected element, tentatively fixes the transformation matrix that is used to calculate the lowest cost as the optimum transformation matrix, and returns the optimum transformation matrix to the transformation matrix update unit 16.

The convergence determination unit 18 determines whether the optimum transformation matrix converges based on the cost, which is calculated using the tentatively-fixed optimum transformation matrix. The convergence determination unit 18 may determine that the optimum transformation matrix converges when the cost calculated using the tentatively-fixed optimum transformation matrix is lower than a predetermined threshold, or the convergence determination unit 18 may determine that the optimum transformation matrix converges when an amount of change of the cost calculated using the tentatively-fixed optimum transformation matrix is lower than the predetermined threshold.

When determining that the optimum transformation matrix converges, the convergence determination unit 18 sets the tentatively-fixed optimum transformation matrix to the finally-fixed optimum transformation matrix, and outputs the finally-fixed optimum transformation matrix to the bit code converter 20. When determining that the optimum transformation matrix does not converge, the convergence determination unit 18 issues an instruction to the transformation matrix update unit 16 to select the element again with respect to the tentatively-fixed optimum transformation matrix and to substitute the substitution candidate for the selected element.

Figure 4:
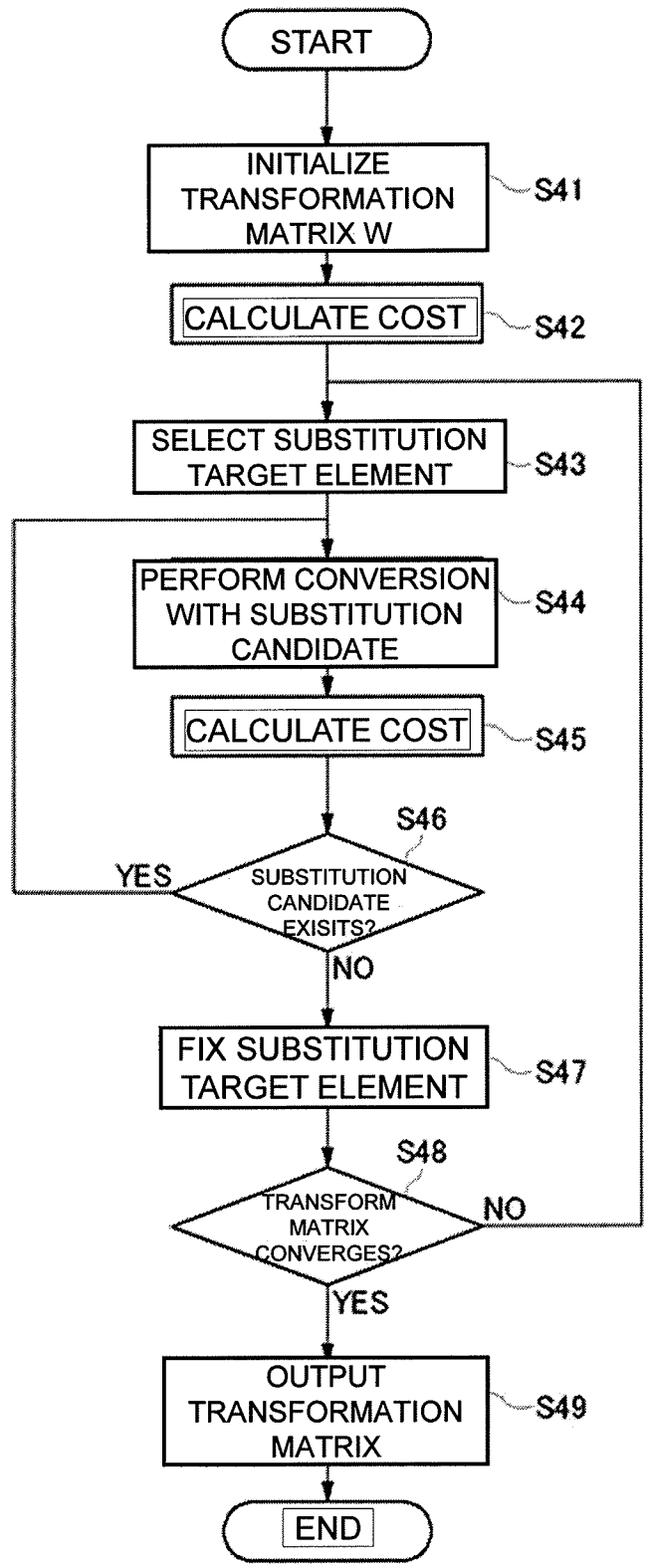
FIG. 4 is a flowchart schematically illustrating a method for determining an optimum transformation matrix in the embodiment.

FIG. 4 is a flowchart schematically illustrating a method for determining the optimum transformation matrix. An outline of the optimum transformation matrix determining method will be described with reference to FIG. 4. Under the constraint condition stored in the constraint condition storage unit 14, the transformation matrix initializing unit 13 initializes the transformation matrix W and outputs the transformation matrix W to the transformation matrix update unit 16 (Step S41). The transformation matrix update unit 16 outputs the initialized transformation matrix, which is input from the transformation matrix initializing unit 14, to the cost function calculator 17, and the cost function calculator 17 calculates the cost by the expression (12) using the initialized transformation matrix (Step S42).

The transformation matrix update unit 16 selects the element that is set to the substitution target from the elements of the transformation matrix W (Step S43). The transformation matrix update unit 16 substitutes the substitution candidate specified by the substitution candidate specifying unit 15 for the selected element, and outputs the transformation matrix W to the cost function calculator 17 (Step S44). The cost function calculator 17 calculates the cost using the transformation matrix W in which the substitution candidate is substituted for the selected element (Step S45).

The substitution candidate specifying unit 16 determines whether the substitution candidate that is not yet used in calculating the cost exists in the substitution candidates specified by the substitution candidate specifying unit 15 (Step S46). When the substitution candidate that is not yet used in calculating the cost exists (YES in Step S46), the flow returns to Step S44 to substitute another substitution candidate for the selected element, and the cost is calculated in Step S45.

When the cost is calculated with respect to all the substitution candidates specified by the substitution candidate specifying unit 15 (NO in Step S46), the cost function calculator 17 fixes the substitution candidate, which has the lowest calculated cost in the substitution candidates, as the selected element (Step S47). Therefore, the optimum transformation matrix is tentatively fixed. After the transformation matrix is tentatively fixed, the convergence determination unit 18 determines whether the transformation matrix converges based on the value of the cost calculated by the tentatively-fixed transformation matrix (Step S48). When the transformation matrix does not converge (NO in Step S48), the convergence determination unit 18 issues the instruction to the transformation matrix update unit 16 to select the substitution target candidate again while outputting the tentatively-fixed transformation matrix to the transformation matrix update unit 16. That is, the flow returns to Step S43, and the pieces of processing in Steps S43 to S48 are repeated.

When the determination that the transformation matrix converges is made in Step S48 by repeating the pieces of processing in Steps S43 to S48, the convergence determination unit 18 outputs the transformation matrix W, which is finally fixed in Step S47, as the finally-fixed optimum transformation matrix (Step S49).

A specific example of the optimum transformation matrix determining method in which the outline is described above will be described below. In the following description, the step to which the processing of the specific example corresponds is specified with reference to FIG. 4.

(Specific Example 1 of Optimum Transformation Matrix Determining Method)

In the coding parameter generator 10 of the specific example 1, an expression (13) is stored as the constraint condition in the constraint condition storage unit 14. Where $w_{i,j}$ is an element in an ith row and a jth column of the transformation matrix W.

$$w_{ij} = \{-1, 0, 1\} \tag{13}$$

The transformation matrix initializing unit 13 randomly initializes the transformation matrix W (Step S41). The transformation matrix update unit 16 randomly selects one of elements $w_{i,j}$ of the transformation matrix W, and sets the selected element to $w_{u,v}$ (Step S43).

FIG. 5 is a view illustrating the substitution candidate specified by the substitution candidate specifying unit 15 in the specific example 1. As illustrated in FIG. 5, the substitution candidate becomes −1 and 0 in the case of $w_{u,v}=1$, the substitution candidate becomes 1 and −1 in the case of $w_{u,v}=0$, and the substitution candidate becomes 0 and 1 in the case of $w_{u,v}=-1$. The transformation matrix update unit 16 substitutes each substitution candidate for the selected element, and outputs the transformation matrix, in which the substitution candidate is substituted for the selected element, to the cost function calculator 17 (Step S44). The cost function calculator 17 calculates the cost with respect to each transformation matrix (Step S45). The cost function calculator 17 compares the original cost to the cost, which is calculated by the transformation matrix in which the substitution candidate is substituted for the selected element, and tentatively fixes the transformation matrix having the lowest cost as the optimum transformation matrix (Step S47). The pieces of processing are repeated until the cost is sufficiently decreased.

According to the specific example 1, the cost can efficiently be minimized while the constraint condition of the expression (13) is maintained. Because the element $w_{i,j}$ of the transformation matrix W has only −1, 0, and 1, necessity of a multiplication is eliminated in the calculation of $W^T x$ when the bit code converter 20 performs the bit code conversion using the expression (8).

(Specific Example 2 of Optimum Transformation Matrix Determining Method)

In the specific example 2, an expression (14) is added to the constraint condition of the specific example 1.

$$|W|_0 = C \tag{14}$$

At this point, the expression (14) is a condition that, the number of elements of non-zero is C in the elements of the transformation matrix W. C is a constant that can arbitrarily be assigned by a user. That is, in the specific example 2, f(W) is minimized under the condition that the number of elements becomes C.

The transformation matrix initializing unit 13 randomly fills the elements of the transformation matrix W with −1 and 1, randomly selects the C elements from the elements of the transformation matrix W, and fills all the elements except the selected C elements with 0, thereby initializing the transformation matrix W (Step S41). The transformation matrix update unit 16 randomly selects one element $w_{i,j}$ of the transformation matrix W (Step S43) (it is assumed that the selected element is $w_{u,v}$).

FIG. 6 is a view illustrating the substitution candidate specified by the substitution candidate specifying unit 15 in the specific example 2. As illustrated in FIG. 6, the substitution candidate specifying unit 15 specifies the substitution candidate such that the condition of the expression (14) is satisfied. Due to the constraint condition of the expression (14), the transformation cannot be performed such that the number of non-zeros varies, so that only the substitution candidate in which the number of non-zeros does not vary is specified. Specifically, as illustrated in FIG. 6, because 1 is the non-zero in the case of $w_{u,v}=1$, only 1 can be transformed into −1 that is of the non-zero. In the case of $w_{u,v}=0$, the number of non-zeros varies when 0 is transformed into 1 or −1, namely, the non-zero. Therefore, there is no substitution candidate for 0. In the case of $w_{u,v}=-1$, because −1 is the non-zero, −1 is transformed only into 1 that is of the non-zero.

The transformation matrix update unit 16 substitutes each substitution candidate for the selected element, and outputs the transformation matrix in which the substitution candidate for the selected element to the cost function calculator 17 (Step S44). Other pieces of processing are identical to those of the specific example 1.

According to the specific example 2, the cost can efficiently be minimized while the constraint conditions of the expressions (13) and (14) are maintained. Because the element $w_{i,j}$ of the transformation matrix W has only −1 and 1, the necessity of the multiplication is eliminated in the calculation of $W^T x$ when the bit code converter 20 performs the bit code conversion using the expression (8). Additionally, in the specific example 2, the transformation matrix W can become an extremely sparse matrix by decreasing the value of C. The speed of the calculation of $W^T x$ can further be enhanced by making the transformation matrix W sparse.

(Specific Example 3 of Optimum Transformation Matrix Determining Method)

In the coding parameter generator 10 of the specific example 3, similarly to the specific example 2, the expressions (13) and (14) are stored as the constraint condition in the constraint condition storage unit 14.

Similarly to the specific example 2, the transformation matrix initializing unit 13 initializes the transformation matrix W (Step S41). In the specific example 3, the transformation matrix update unit 16 randomly selects two elements $w_{i,j}$ of the transformation matrix W (Step S43) (it is assumed that the selected elements are $w_{u,v}$ and $w_{p,q}$).

FIG. 7 is a view illustrating the substitution candidate specified by the substitution candidate specifying unit 15 in the specific example 3. As illustrated in FIG. 7, the substitution candidate specifying unit 15 specifies the substitution candidate such that the condition of the expression (14) is satisfied. Due to the constraint condition of the expression (14), the transformation cannot be performed such that the number of non-zeros varies, so that only the substitution candidate in which the number of non-zeros does not vary is specified. For example, because of two non-zeros in the case of $(w_{u,v}, w_{p,q})=(1,1)$, the substitution candidate becomes $(-1,-1)$, $(1,-1)$, and $(-1,1)$ such that the condition that the number of non-zeros is two is maintained. Similarly, in the case that one non-zero exists in $(w_{u,v}, w_{p,q})$ the substitution candidate is specified such that the condition that the number of non-zeros is one is maintained. Due to the constraint condition of the expression (14), it is necessary to maintain the state in which the number of non-zeros is zero in the case of $(w_{u,v}, w_{p,q})=(0,0)$. Therefore, there is no substitution candidate for $(0,0)$. In this case, $w_{u,v}$ and $w_{p,q}$ are newly selected again.

The transformation matrix update unit 16 substitutes each substitution candidate for the selected element, and outputs the transformation matrix, in which the substitution candidate is substituted for the selected element, to the cost function calculator 17 (Step S44). Other pieces of processing are identical to those of the specific example 1.

According to the specific example 3, similarly to the specific example 2, the speed of the calculation of $W^T x$ can further be enhanced by making the transformation matrix W sparse. In the specific example 2, the element of 0 is fixed in the initialized transformation matrix W. On the other hand, in the specific example 3, the position of the element is optimized while the number of elements of 0 is fixed, so that the transformation matrix W can more suitably be optimized.

As described above, in the process of fixing the optimum transformation matrix, each time $w_{u,v}$ is updated, the bit code converter 20 performs the bit code conversion, and the cost function calculator 17 calculates the cost function f(W). A method for largely simplifying the calculation of the cost function to efficiently calculate the cost function will be described below.

Figure 8:
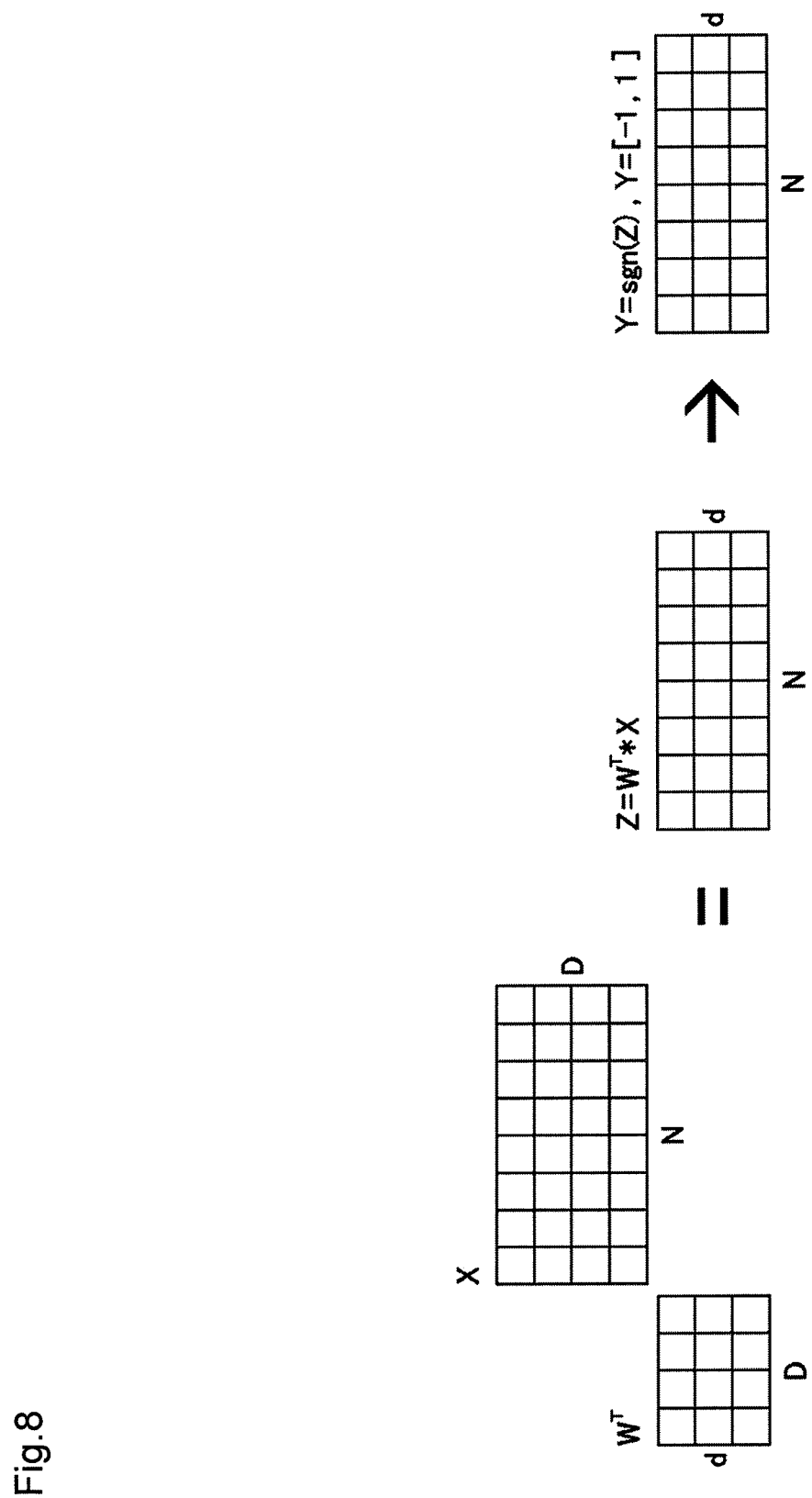
FIG. 8 is a view illustrating processing for converting a feature vector into a bit code in the embodiment.

FIG. 8 is a view illustrating processing for converting the feature vector into the bit code. FIG. 8 illustrates the expression (8). In FIG. 8, each column of a matrix X is one feature vector x, each column of a matrix Z is $W^T x$, and each column of a matrix Y is y expressed by the expression (8).

Figure 9:
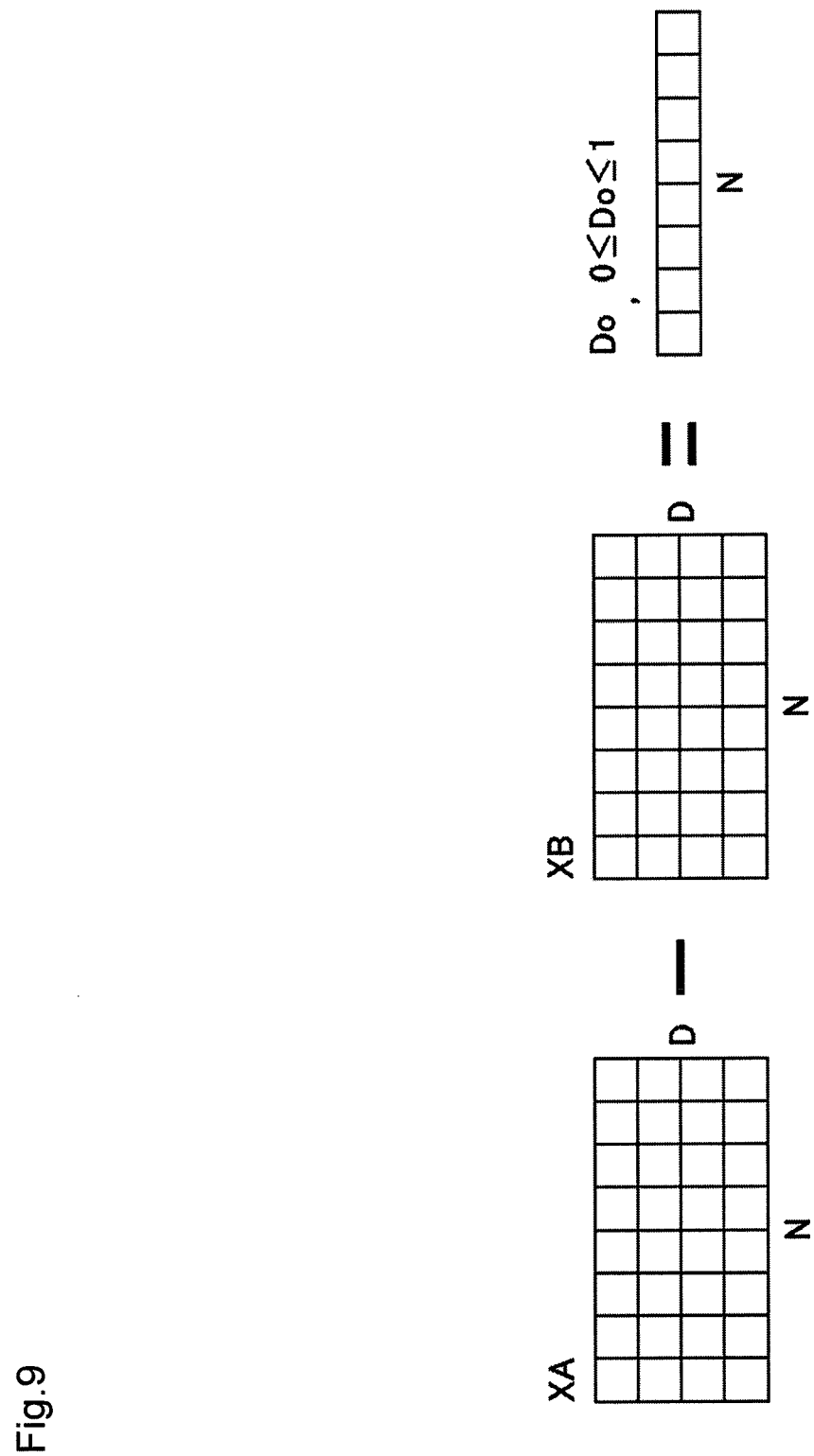
FIG. 9 is a view illustrating processing for fixing a distance between a feature vector XA and a feature vector XB before the feature vector is converted into the bit code in the embodiment.

FIG. 9 is a view illustrating processing for fixing a distance between a feature vector XA and a feature vector XB before the feature vector is converted into the bit code. In FIGS. 9, 10, 11, and 14, for the sake of convenience, a negative sign is used as a symbol that typifies the calculation of the distance between feature vectors (or bit codes). In FIG. 9, each column of Do expresses a normalized distance between the column corresponding to the feature vector XA and the column corresponding to the feature vector XB.

Figure 10:
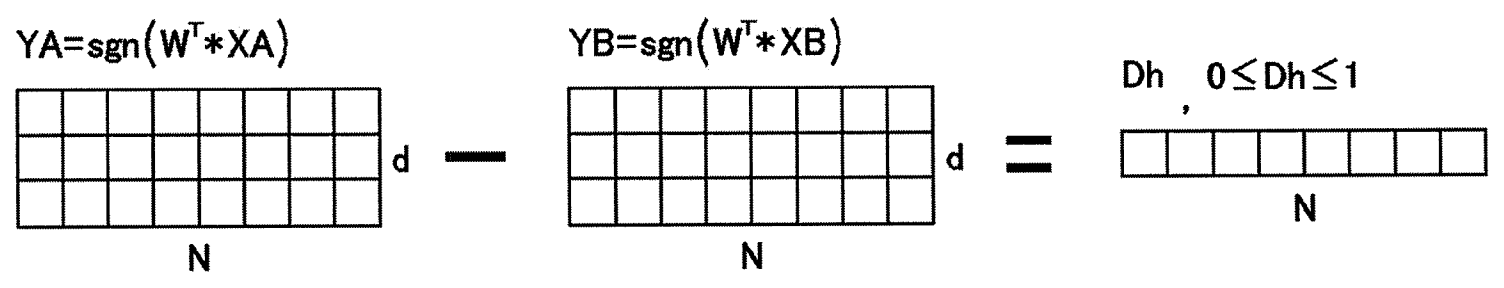

FIG. 10 is a view illustrating processing of fixing a Hamming distance after the feature vector XA and the feature vector XB are converted into a bit code YA and a bit code YB. In FIG. 10, each column of Dh expresses a normalized distance between the column corresponding to the bit code YA and the column corresponding to the bit code YB.

Figure 11:
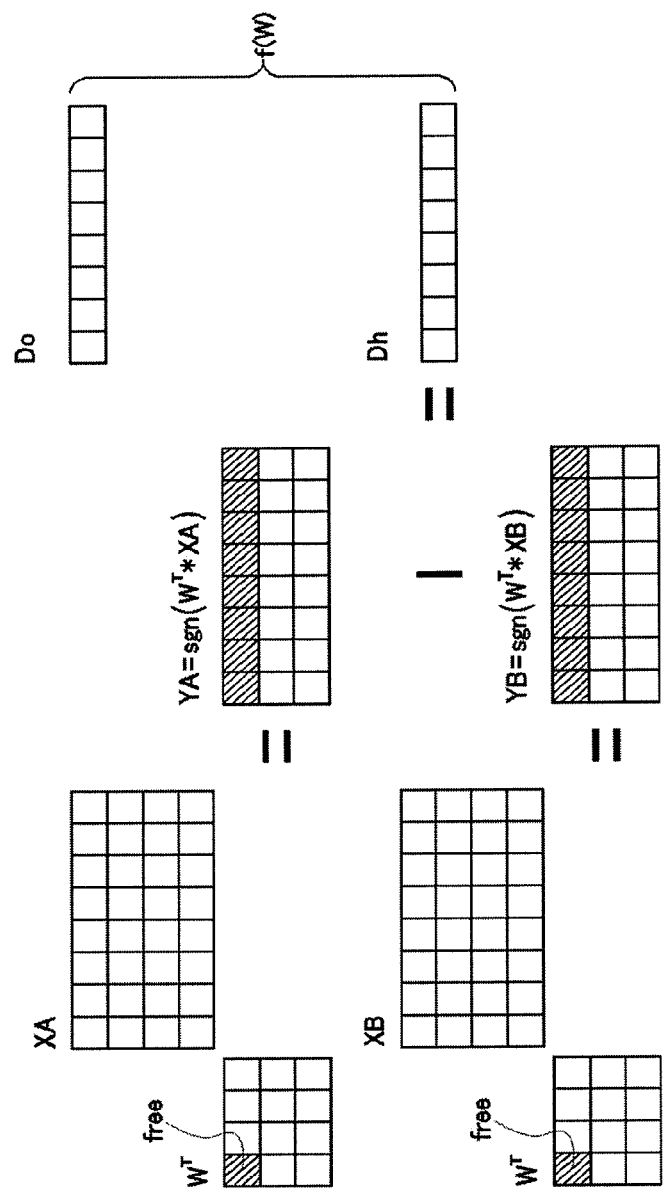
FIG. 11 is a view illustrating a relationship between an element selected in a transformation matrix and a cost function in the embodiment.

FIG. 11 is a view illustrating a relationship between the element selected in the transformation matrix and the cost function. As illustrated in FIG. 11, assuming that the selected element exists in the first row of $W^T$, only elements of the first row are influenced in the bit codes YA and YB by substituting the substitution candidate for the selected element $w_{1,\infty}$ (indices "1,∞" expresses an arbitrary column of the first row). Therefore, when the Hamming distance between the bit codes YA and YB is fixed while each substitution candidate is substituted for the element $w_{1,\infty}$, actually the value of each column of each Hamming distance is a value, which is fixed while only the elements of the first row are changed in the bit codes YA and YB. That is, in the bit codes YA and YB of FIG. 11, an overlapping calculation is performed with respect to the rows except the first row indicated by hatched lines every time the substitution candidate is substituted for the element $w_{1,\infty}$. Accordingly, the calculation speed can be enhanced by avoiding the overlapping calculation.

Figure 12:
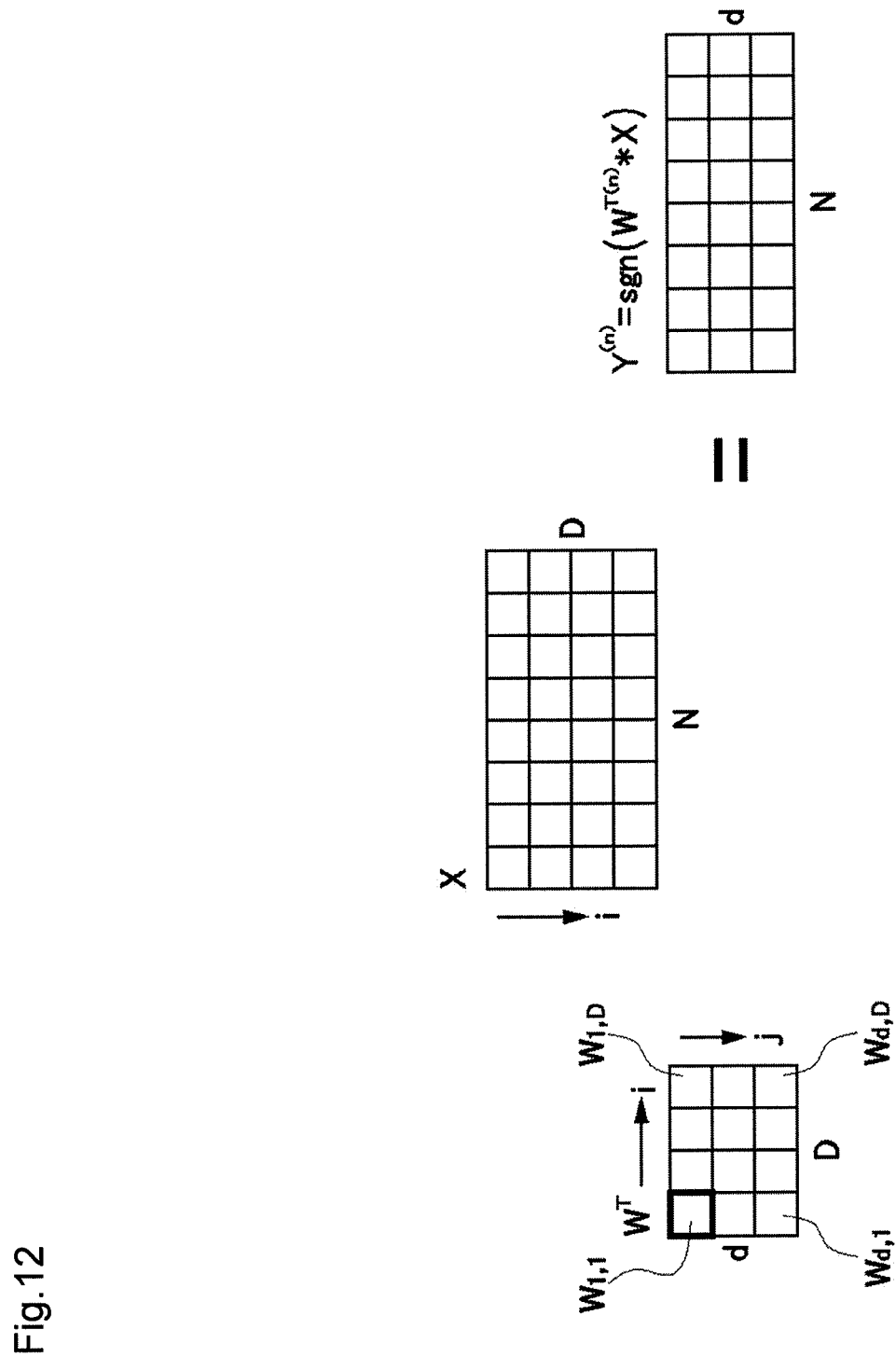
FIG. 12 is a view illustrating processing for fixing a bit code Y when an nth substitution candidate is substituted for an element selected in a transformation matrix W in the embodiment.

FIG. 12 is a view illustrating processing for fixing the bit code Y when the nth substitution candidate is substituted for the element selected in the transformation matrix W. In FIG. 12, indices (n) of the bit code Y and (the transpose of) the transformation matrix $W^T$ express that the nth substitution candidate is substituted by the selected element. The element $w_{1,1}$ in the first row and the first column of $W^T$ is selected in the example of FIG. 12.

Figure 13:
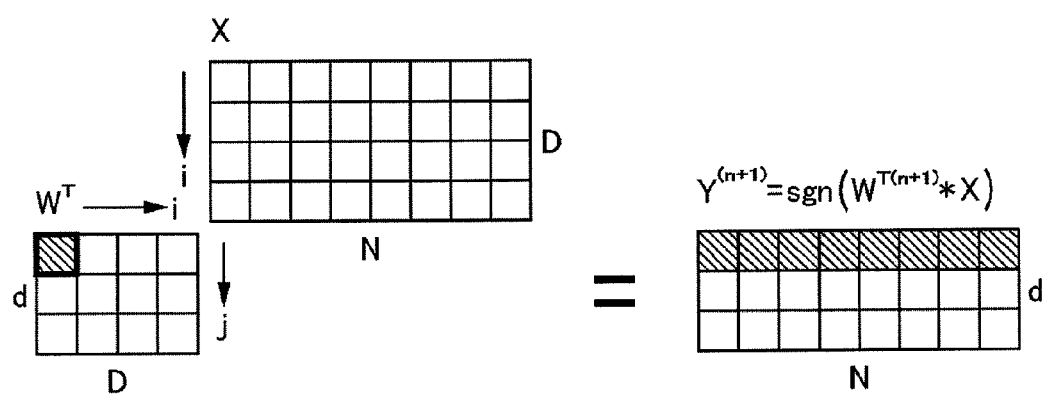
FIG. 13 is a view illustrating processing for fixing the bit code Y when an (n+1)-th substitution candidate is substituted for a selected element $w_{1,1}$ from the state of FIG. 12 in the embodiment.

FIG. 13 is a view illustrating processing for fixing the bit code Y when the (n+1)-th substitution candidate is substituted for the selected element $w_{1,1}$ from the state of FIG. 12. In the bit code $Y^{(n+1)}$ of FIG. 13, only the first row indicated by the hatched lines is changed from the bit code $Y^{(n)}$ of FIG. 12.

At this point, expressions (15) and (16) are defined as follows.

$$Y_{1,\infty}^{(n)} = w_{1,\infty}^{(n)} * X \tag{15}$$

$$Y_{1,\infty}^{(n+1)} = w_{1,\infty}^{(n+1)} * X \tag{16}$$

The index "1,∞" of w expresses that the selected element w is the first row (column is arbitrary), and the index "1,∞" of Y expresses the first row of the bit code Y.

When the expressions (15) and (16) are defined as described above, X and the elements except the selected element w in the transformation matrix W do not vary even if the substitution candidate is substituted for the selected element w. Therefore, an expression (17) holds.

$$Z_{1,\infty}^{(n+1)} = Z_{1,\infty}^{(n)} + (w_{1,\infty}^{(n+1)} - w_{1,\infty}^{(n)}) * X_{1,\infty} \tag{17}$$

An expression (18) holds from the expression (17).

$$Y_{1,\infty}^{(n+1)} = sgn(Z_{1,\infty}^{(n+1)}) = sgn(Z_{1,\infty}^{(n)} + (w_{1,\infty}^{(n+1)} - w_{1,\infty}^{(n)}) * X_{1,\infty}) \tag{18}$$

Figure 14:
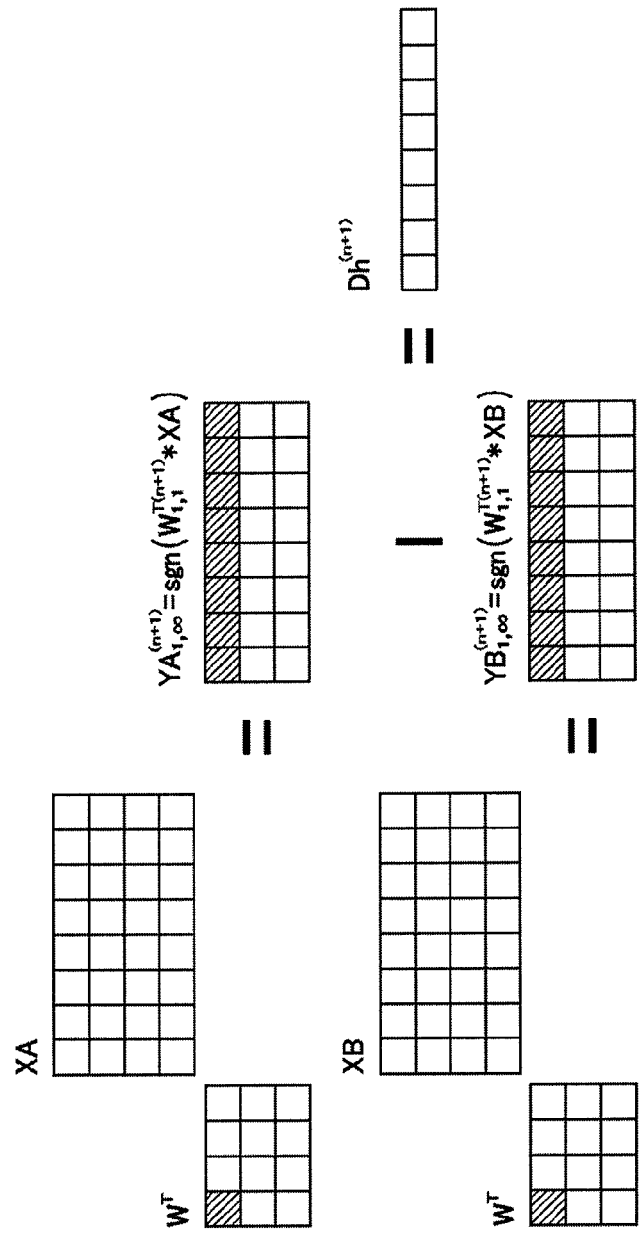
FIG. 14 is a view illustrating processing of fixing the Hamming distance when the (n+1)-th substitution candidate is substituted for the selected element $w_{1,1}$ in the embodiment.

FIG. 14 is a view illustrating processing of fixing the Hamming distance when the (n+1)-th substitution candidate is substituted for the selected element $w_{1,1}$. The index (n+1) positioned on the upper right of the Hamming distance Dh expresses that the (n+1)-th substitution candidate is substituted for the selected element $w_{1,1}$. The Hamming distance $Dh^{(n+1)}$ differs from the Hamming distance $Dh^{(n)}$, and the difference between the Hamming distances $Dh^{(n+1)}$ and $Dh^{(n)}$ is actually attributed to a difference between the first rows of the bit codes YA and YB.

Accordingly, when the (n+1)-th substitution candidate is substituted by the selected element $w_{1,1}$, the Hamming distance $Dh^{(n+1)}$ can be fixed by an expression (19).

$$Dh^{(n+1)} = Dh^{(n)} + \frac{\Delta Y_{1,\infty}^{(n+1)} - \Delta Y_{1,\infty}^{(n)}}{2d} \tag{19}$$

At this point, $\Delta Y_{1,\infty}$ is defined by an expression (20).

$$\Delta Y_{1,\infty} = |YA_{1,\infty} - YB_{1,\infty}| \tag{20}$$

As described above, when the (n+1)-th substitution candidate is substituted for the selected element $w_{1,1}$, the first row of the bit code $Y^{(n+1)}$ can be fixed by utilizing the calculation result, in which the nth substitution candidate is substituted for the selected element $w_{1,1}$, as illustrated in the expressions (15) to (19). When the (n+1)-th substitution candidate is substituted for the selected element $w_{1,1}$, the Hamming distance $Dh^{(n+1)}$ can be fixed using the Hamming distance $Dh^{(n)}$ and the first rows of the bit codes $YA^{(n)}$ and $YB^{(n)}$, in which the nth substitution candidate is substituted for the selected element $w_{1,1}$.

In the above description, the selected element w is $w_{1,1}$ in the first row and the first column. On the other hand, expressions (21) and (22) are obtained by generalizing the expression (18) and (19).

$$\Delta Y_{j,\infty}^{(n+1)} = sgn(Z_{j,\infty}^{(n)} + (w_{j,\infty}^{(n+1)} - w_{j,\infty}^{(n)}) * X_{j,\infty}) \tag{21}$$

-continued $$Dh^{(n+1)} = Dh^{(n)} + \frac{\Delta Y_{j,\infty}^{(n+1)} - \Delta Y_{j,\infty}^{(n)}}{2d} \quad (22)$$

At this point, $\Delta Y_{j,\infty}$ is defined by an expression (23).

$$\Delta Y_{j,\infty} = |YA_{j,\infty} - YB_{j,\infty}| \quad (23)$$

When the substitution candidate is substituted for the selected element, the cost function calculator 17 calculates the cost function f(W) using the expressions (21) and (22).

The embodiment of the invention is described above. However, the invention is not limited to the embodiment, but various modifications can be made. For example, the constraint condition stored in the constraint condition storage unit 14 may be a condition that all the elements of the transformation matrix are integers, or a condition that all the elements of the transformation matrix are power-of-two numbers.

As described above, the invention has the effects that the feature vector can be converted into the bit code at high speed and that the short bit code can be generated. For example, the invention is useful for the feature conversion device that converts the feature vector into the bit code using the transformation matrix in order to search the similar information.

What is claimed is:

1. A feature conversion device comprising:
a learning pair selector that inputs a plurality of learning feature vectors thereto and selects a plurality of pairs of learning feature vectors from the learning feature vectors;
a bit code converter that transforms the learning feature vector using a transformation matrix and converts the transformed learning feature vector into a bit code;
a cost function calculator that calculates a cost function indicating a sum of differences between a distance between the learning feature vectors input to the learning pair selector and a distance between the bit codes into which the transformed learning feature vectors are converted by the bit code converter with respect to all the pairs of learning feature vectors; and
a transformation matrix update unit that selects an element of the transformation matrix used in the bit code converter and substitutes a substitution candidate for the selected element to update the transformation matrix,
wherein the bit code converter transforms the learning feature vector using the transformation matrix updated by the transformation matrix update unit and converts the transformed learning feature vector into a bit code,
the cost function calculator fixes the element by selecting one element from the substitution candidate and the original element based on the cost function when the transformation matrix update unit substitutes the substitution candidate for the element of the transformation matrix,
the transformation matrix update unit selects the element while sequentially changing the elements and the cost function calculator fixes the selected element every time the transformation matrix update unit selects the element, thereby finally fixing the optimum transformation matrix, and
the substitution candidate is specified such that a speed of transformation processing that the bit code converter performs using the transformation matrix is enhanced.

2. The feature conversion device according to claim 1, wherein the cost function calculator calculates an amount of change of the cost function when each of the substitution candidates is substituted for the element, fixes an adoption probability according to the amount of change, and selects one element from the substitution candidate and the original element according to the adoption probability.

3. The feature conversion device according to claim 1, wherein the distance between the learning feature vectors input to the learning pair selector with respect to the pair of learning feature vectors is a distance based on one of an L1 norm, an L2 norm, and an intervector angle.

4. The feature conversion device according to claim 1, wherein the distance between the bit codes converted by the bit code converter with respect to the pair of learning feature vectors is a distance based on the Hamming distance.

5. The feature conversion device according to claim 1, wherein the element of the transformation matrix is restricted to an integer, and the substitution candidate is restricted to an integer.

6. The feature conversion device according to claim 5, wherein the element of the transformation matrix is restricted to one of −1, 0, and 1, and the substitution candidate is restricted to one of −1, 0, and 1.

7. The feature conversion device according to claim 5, wherein the element of the transformation matrix is restricted to a power-of-two number, and the substitution candidate is restricted to a power-of-two number.

8. The feature conversion device according to claim 1, wherein the number of non-zero elements of the transformation matrix is restricted to a predetermined range, and the substitution candidate is specified such that the number of non-zero elements of the transformation matrix is maintained within the predetermined range.

9. The feature conversion device according to claim 1, wherein the learning pair selector selects an arbitrary pair of learning feature vectors from the plurality of input learning feature vectors.

10. The feature conversion device according to claim 1, wherein the learning pair selector selects a pair of learning feature vectors from the plurality of input learning feature vectors based on the distance between the learning feature vectors.

11. The feature conversion device according to claim 10, wherein the learning pair selector selects a pair of learning feature vectors from the plurality of input learning feature vectors such that the number of sets of a pair of learning feature vectors having the distance lower than a predetermined distance and the number of sets of a pair of learning feature vectors having the distance not lower than the predetermined distance become a predetermined ratio.

12. The feature conversion device according to claim 10, wherein the learning pair selector selects a pair of learning feature vectors from the plurality of input learning feature vectors such that a frequency of the distance becomes a uniform distribution or a particular distribution.

13. The feature conversion device according to claim 10, wherein the learning pair selector selects a pair of learning feature vectors from the plurality of input learning feature vectors such that the number of sets of a pair of learning feature vectors having the farthest distance relationship and the number of sets of a pair of learning feature vectors having the closest distance relationship become a predetermined ratio.

14. The feature conversion device according to claim 1, the cost function calculator uses a result of the cost function, which is calculated using the transformation matrix before the transformation matrix update unit substitutes the substitution candidate for the element of the transformation matrix, to calculate the cost function of the transformation matrix after the transformation matrix update unit substitutes the substitution candidate for the element of the transformation matrix.

15. A similar information search apparatus comprising:
the feature conversion device according to claim 1, and a similar vector search unit,
wherein the bit code converter converts the plurality of learning feature vectors into the plurality of bit codes using the fixed optimum transformation matrix,
the bit code converter converts an input feature vector into the bit code using the fixed optimum transformation matrix when the input feature vector is provided, and
the similar vector search unit includes:
a bit code retaining unit that retains the plurality of bit codes into which the plurality of learning feature vectors are converted by the bit code converter; and
a nearest neighbor search unit that inputs the bit code into which the feature vector is converted by the input bit code converter and searches a bit code similar to the bit code into which the feature vector is converted, the bit code is searched from the plurality of bit codes retained by the bit code retaining unit by a nearest neighbor search.

16. A coding parameter generating method for outputting a transformation matrix as a coding parameter used to convert a feature vector into a bit code, the coding parameter generating method comprising:
a first step of selecting a plurality of pairs of learning feature vectors from a plurality of learning feature vectors;
a second step of initializing the transformation matrix under a constraint condition;
a third step of calculating a cost function indicating a sum of differences between a distance between the learning feature vectors and a distance between the bit codes into which the learning feature vectors are converted using the initialized transformation matrix with respect to the plurality of pairs of learning feature vectors;
a fourth step of selecting an element set to a substitution target from elements of the transformation matrix;
a fifth step of substituting a particular substitution candidate for the element selected in the fourth step;
a sixth step of calculating the cost function using the transformation matrix in which the substitution candidate is substituted for the selected element in the fifth step;
a seventh step of determining whether all the substitution candidates are substituted for the selected element, and returning to the fifth step when all the substitution candidates are not substituted for the selected element;
an eighth step of tentatively fixing an optimum transformation matrix by fixing the substitution candidate having the smallest calculated cost function in the substitution candidates as the selected element when all the substitution candidates are substituted for the selected element in the seventh step;
a ninth step of determining whether the optimum transformation matrix tentatively fixed in the eighth step converges, and returning to the fourth step when the optimum transformation matrix does not converge; and
a tenth step of outputting the tentatively-fixed optimum transformation matrix as a finally-fixed optimum transformation matrix when the optimum transformation matrix tentatively fixed in the eighth step converges,
wherein one or more of the steps are performed using a processor.

17. A non-transitory computer-readable medium storing a program to perform the coding parameter generation method according to claim 16.

* * * * *